Patented Mar. 28, 1933

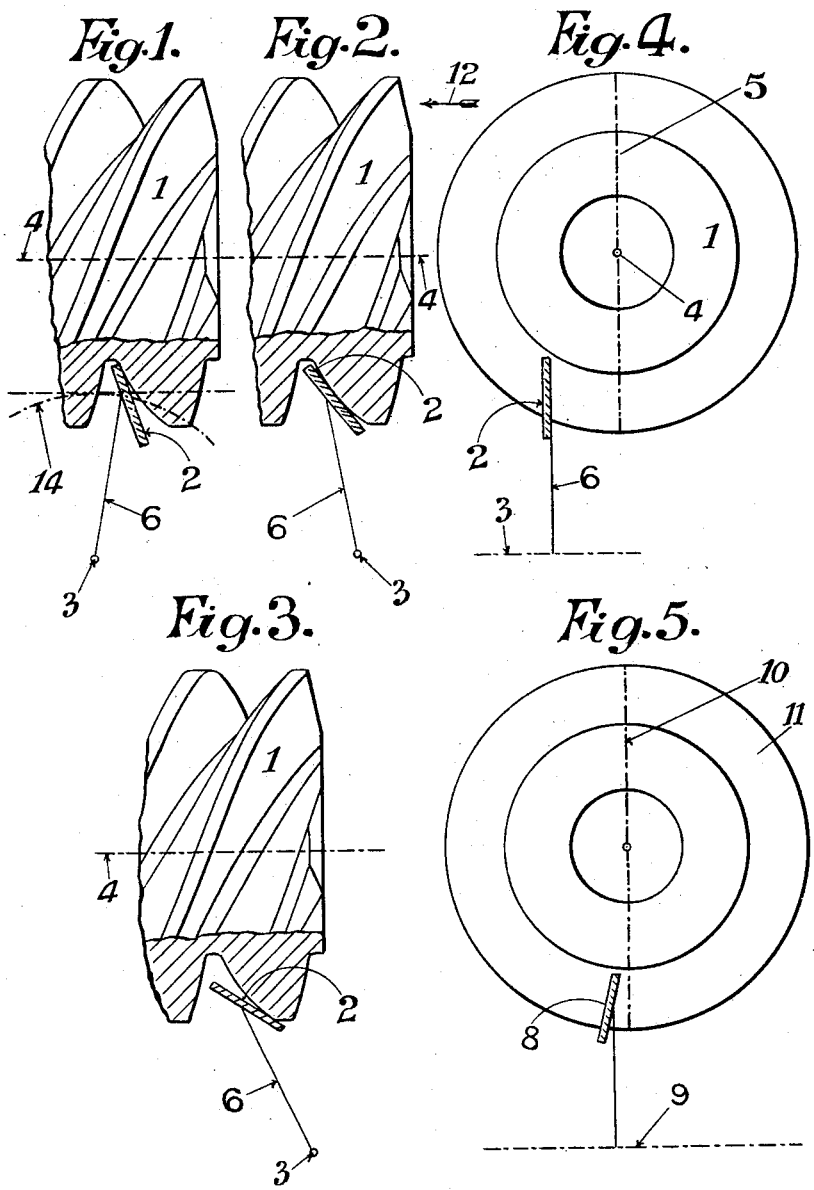

1,903,273

UNITED STATES PATENT OFFICE

HARRY WALKER, OF MILNROW, NEAR ROCHDALE, ENGLAND, ASSIGNOR OF ONE-HALF TO JOHN HOLROYD & COMPANY LIMITED, OF MILNROW, NEAR ROCHDALE, ENGLAND

WORM GEARING

Application filed November 30, 1931, Serial No. 578,045, and in Great Britain February 20, 1931.

This invention relates to worm gearing having worms of the parallel type and has for its object to enable good linear contact to be obtained between the worm thread and the teeth of the worm wheel employed therewith, coupled with a better action of the lubricant on the working surfaces, which together produce an improved efficiency and load capacity, and to facilitate the production of the worm thread.

According to my invention the face of the worm thread is such as would be generated, whilst the worm rotates about the axis of the thread to be produced, by a straight line which turns about an external axis traversed along a path parallel with the thread axis and lies in a plane which does not contain the worm axis.

The straight line may be parallel with an axial worm plane which is intersected in a perpendicular manner by the external axis, or it may be oblique to and intersect or it may be oblique to and not intersect the said axial plane, the face such as would be generated thereby being similar or substantially similar in both cases.

To obtain the good linear contact rendered possible by my improved worm, the faces of the teeth of the worm wheel to be employed in conjunction with the worm can be shaped by means of a tool having a cutting edge or edges similar to the profile of the improved worm and arranged to rotate at the same speed as the worm relative to the rotating worm wheel. The pitch radius of the worm wheel may be the same as, or greater than, or less than the distance between the pitch helix of the worm thread and the said external axis.

I attain this object by the means illustrated diagrammatically in the accompanying sheet of drawing, wherein—

Figures 1 to 3 are side views, partly in section, of a portion of a worm in the process of being formed.

Figure 4 is an end view of the said worm.

Figure 5 is an end view of a worm and illustrates a modification in the said method.

One suitable method of producing my improved form of worm thread consists in shaping one face of the worm thread by rotating the worm 1, Figures 1 to 4, about its own axis and rotating a cutter having a straight cutting edge 2 about an axis 3 which is at right angles to the worm axis 4 and to a diameter 5 of the worm axis whilst moving the worm 1 axially in the direction of the axial run of the thread being produced, the cutting edge 2 being set at an angle to the radius 6 springing from the axis 3, see Figures 1 to 3, and being arranged to rotate in a plane which is laterally off-set from but parallel with the diameter 5.

The same section of the worm 1 is shown in all of the Figures 1 to 3, but the worm 1 is shown as being in a different axial position in each of these figures, consequent on its axial movement in contra-direction of the axial run of the thread which is shown by way of example being a left-hand one and therefore, when rotated in clock-wise direction, as running from the right hand end to the left hand end of the worm 1; the direction of axial movement therefore being from right to left. In Figure 1 the cutting edge 2 is commencing its cut at the root of the thread.

As the worm 1 rotates in clockwise direction, when regarded in the direction of the arrow 12 of Figure 1, and moves axially from right to left, the cutting edge 2 turns about the axis 3 in anti-clock-wise direction, namely in the same direction as the run of the thread until it leaves the thread gap. Figure 2 shows the cutting edge 2 at the mid-period of its action and Figure 3 shows the said edge at the final period of its action. The speed of the cutter edge 2 at its pitch radius 6 reckoned along its pitch circle 14 equals the speed of axial run of the worm thread plus the speed of axial displacement of the worm.

In practice, as is common in the art of worm cutting, there may be a plurality of cutting edges 2. The axial displacement of the worm is so slow, in relation to the rotary movements of the worm and cutting edge or edges as to enable the cutting edge or edges to take successive cuts of normal depth whilst producing a cylindrical worm.

The other face of the thread is shaped in a similar manner, the plane in which the cutting edge 2 rotates being equally offset at the opposite side of the diameter 5.

Instead of moving the worm 1 axially in the same direction as the axial run of the thread, the worm 1 may be moved in contra-direction to the axial run of the said thread, in which case the movement of the cutting edge would be in the same direction as the run of the thread, but the speed of the cutter edge at its pitch radius reckoned along its pitch circle equals the speed of axial run of the thread minus the speed of axial displacement of the worm.

Instead of moving the worm 1 axially, the axis 3 about which the cutting edge turns may be moved parallel with the worm axis in the same direction as or in contra-direction to axial run of the worm thread.

The cutting edges may be at an angle to the plane containing hereinbefore referred to diameter of the worm. For example, as shown in Figure 5, the cutting edge 8 which turns about the axis 9 is arranged at an angle to the diameter 10 of the worm 11. The diameter 10 corresponds with the diameter 5 of Figure 4. In both Figures 4 and 5 the cutting edge 2 revolves in an off-set plane relative to the worm centre.

In lieu of rotating the cutting edge in an off-set plane, the axis about which it is rotated may be in the plane containing the diameter 10, Figure 5, but in this method the cutting edge must be twisted, so that it is oblique relative to the diameter 10, the obliquity being different for each thread face. For one thread face, the angle of the cutting edge is that shown in Figure 5 in connection with the cutting edge 8. The position of the cutting edge in this method increases its resistance against damage.

In lieu of arranging the axis 3 of Figures 1 to 4 or the axis 9 of Figure 5 at right angles or normal to the plane containing the worm axis and the diameter 5 or the diameter 10, the axis 3 or 9 may be arranged at right angles or normal to a plane containing the diameter 5 or the diameter 10, but not containing the worm axis.

I claim—

1. Worm gearing comprising a worm of the parallel type having a worm thread profile which is such as would be produced, whilst the worm rotates, by a straight line which turns about an external axis traversed along a path parallel with the axis of the worm and lies in a plane which is offset from the worm axis.

2. Worm gearing according to claim 1 wherein the worm thread profile is such as would be produced by the said straight line when parallel with an axial worm plane which is intersected in a perpendicular manner by the said external axis.

3. Worm gearing according to claim 1 wherein the worm thread profile is such as would be produced by a straight line which turns about an axis which is normal to an axial plane of the worm.

In testimony whereof, I have signed my name to this specification at Manchester in the county of Lancaster, England, this 17th day of November, 1931.

HARRY WALKER.